Sept. 10, 1963
A. P. WATERSON
3,103,078
LAND LEVELER
Filed Dec. 7, 1962
3 Sheets-Sheet 3
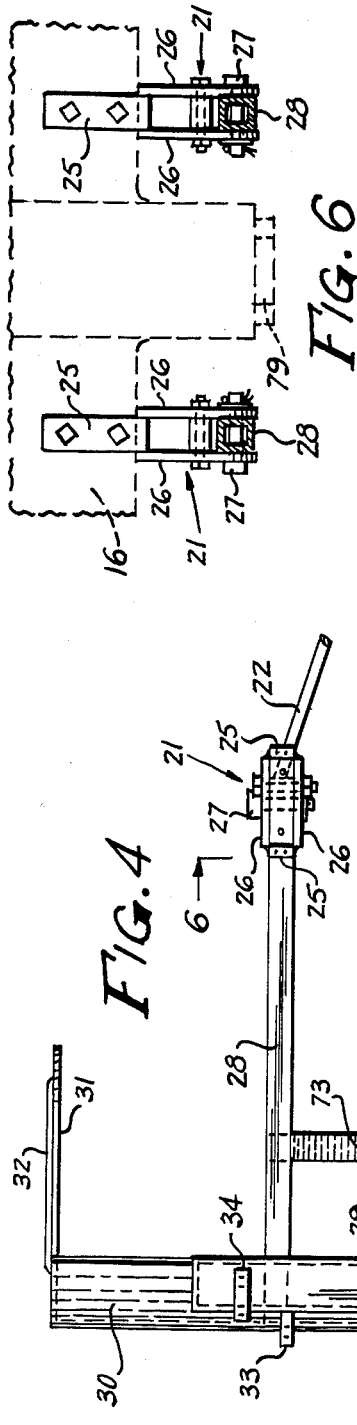
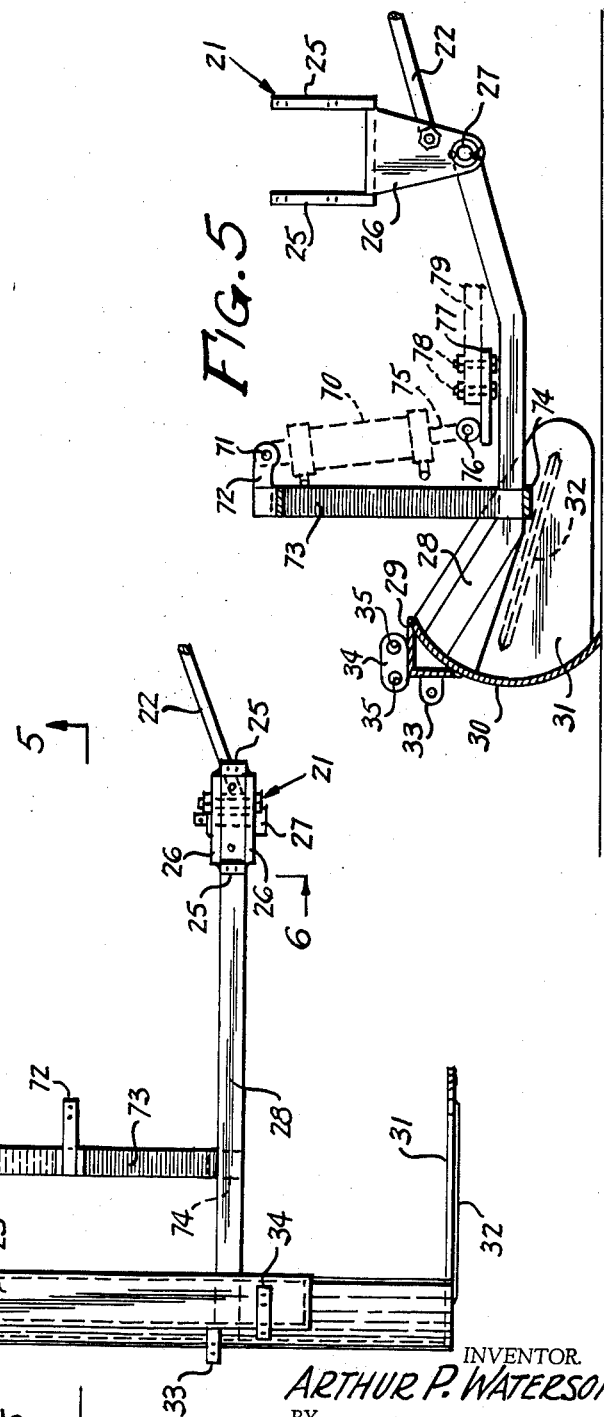
INVENTOR.
ARTHUR P. WATERSON
BY
Kimmel & Crowell
ATTORNEYS.

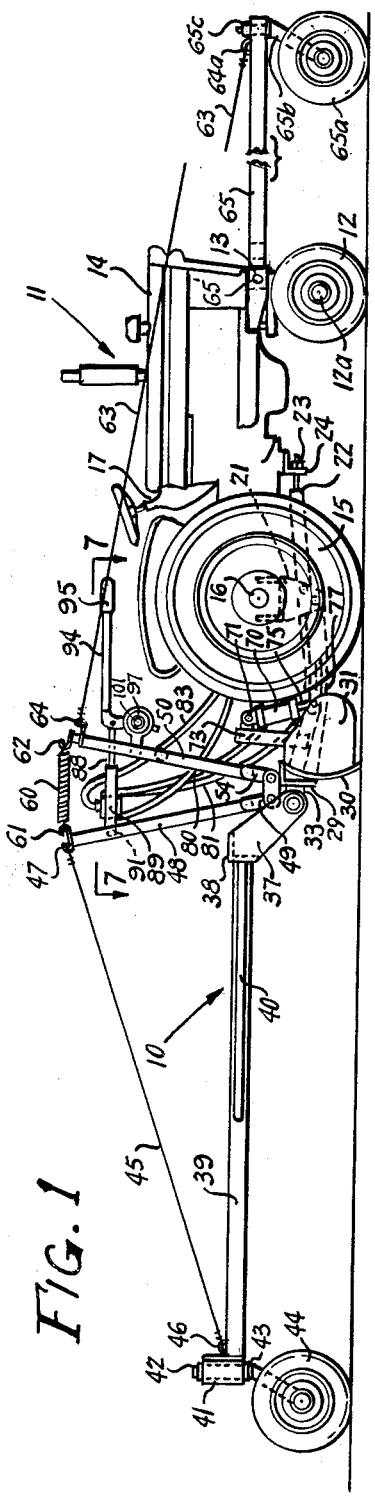
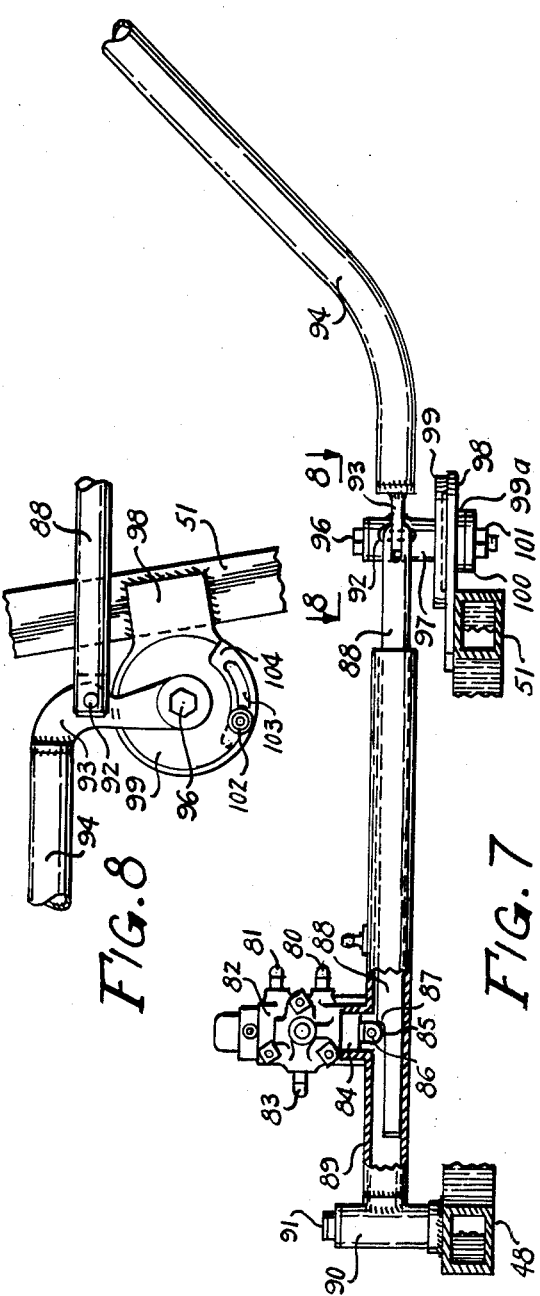

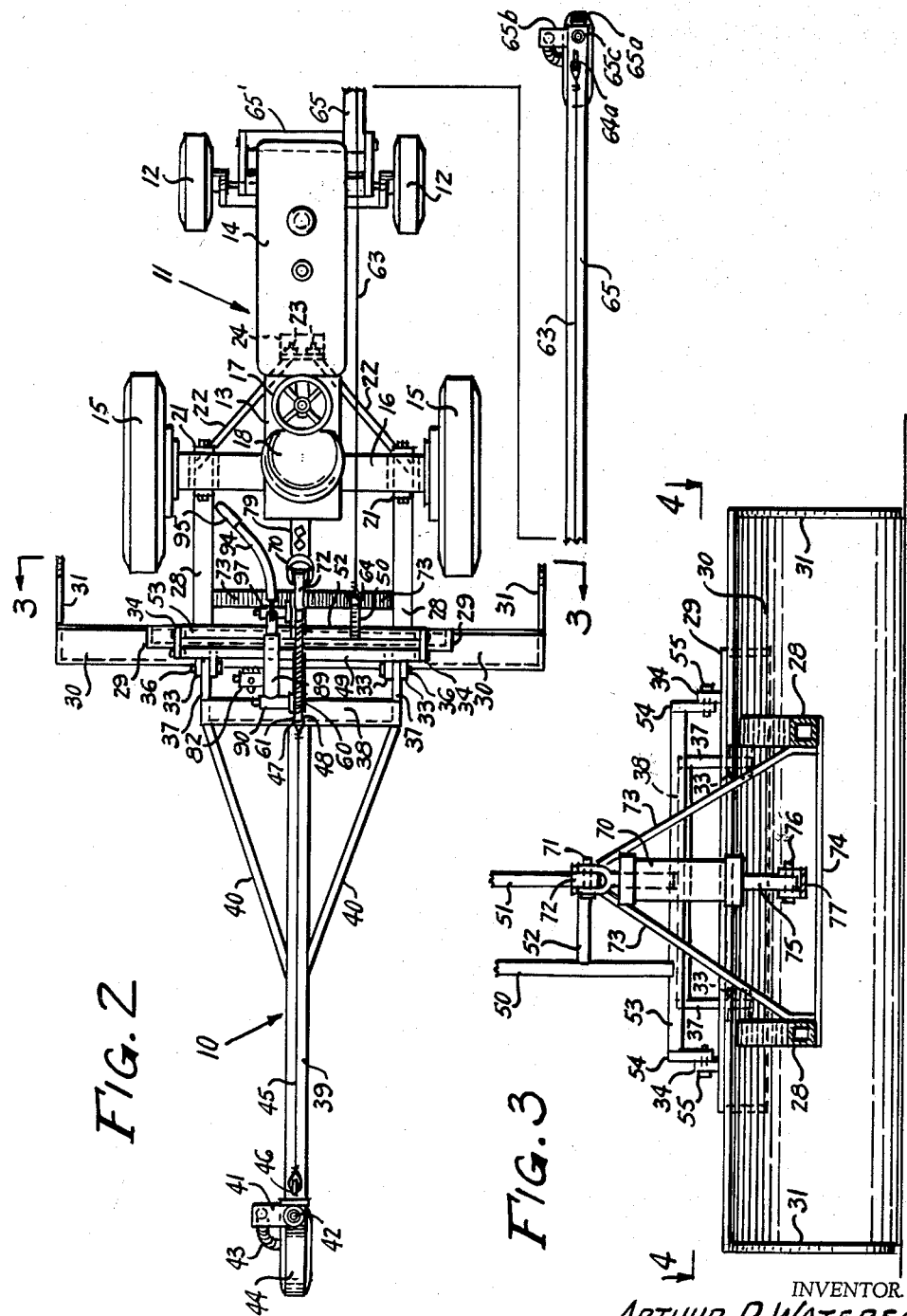

United States Patent Office 3,103,078
Patented Sept. 10, 1963

3,103,078
LAND LEVELER
Arthur P. Waterson, Box 415, Dighton, Kans.
Filed Dec. 7, 1962, Ser. No. 243,081
3 Claims. (Cl. 37—180)

This invention relates to a land leveler and has as its primary object the provision of an improved tractor mounted scraper blade having automatically actuated means for varying the height of the blade in accordance with the contour of the ground, and constitutes an improvement over my prior patent entitled "Land Leveler," No. 3,034,239, dated May 15, 1962.

An important object of this invention is the provision of a device of this character which is particularly adapted for fine work in leveling minor protuberances and humps in ground to be leveled after the primary or coarse leveling has been accomplished in the usual manner.

A more specific object of the invention comprises the provision of a rear feeler element adapted to be attached to the rear of a scraper blade, and extending a material distance rearwardly therefrom, the feeler element actuating hydraulic means to vary the height of the scraper blade mounted on the rear end of a tractor or the like from the ground to be leveled, in accordance with the contour of the ground.

An additional object of the invention resides in the provision of an improved valve mechanism controlled by a tracer wheel carried by the rear feeler element which automatically varies the level of the scraper blade from the ground.

Still another object of the invention is the provision of a mechanism whereby the control may be placed in neutral position so that the level of the blade will be unaffected when the device is turning corners, for example, and the rear tracer wheel is thus positioned over ground which has not been leveled, and wherein the relationship of the terrain has no bearing on the surface to be leveled.

An additional object of the invention resides in the provision of an improved means for actuating a hydraulic piston and linkage therefor whereby the scraper blade is automatically raised and lowered in accordance with irregularities and the contour of the ground to be leveled.

Still another object resides in the provision of a device of this character which is sturdy and durable in construction, reliable and efficient in operation, and relatively simple and inexpensive to manufacture.

Other objects reside in the combinations of elements, arrangements of parts, and features of construction, all as will be more fully pointed out hereinafter and disclosed in the accompanying drawings wherein:

FIGURE 1 is a side elevational view of one form of leveler constructed in accordance with the instant invention shown as attached to a conventional tractor.

FIGURE 2 is a top plan view of the leveler of FIGURE 1.

FIGURE 3 is a sectional view taken substantially along the line 3—3 of FIGURE 2 as viewed in the direction indicated by the arrows.

FIGURE 4 is a fragmentary top plan view of the scraper blade and certain related elements, portions of the mechanism being omitted for the sake of clarity of illustration.

FIGURE 5 is a sectional view taken substantially along the line 5—5 of FIGURE 4 as viewed in the direction indicated by the arrows, parts thereof being omitted for the sake of clarity.

FIGURE 6 is a sectional view taken substantially along the line 6—6 of FIGURE 4, of certain additional components comprising a part of the tractor being illustrated in dotted lines.

FIGURE 7 is an enlarged fragmentary view partially in section and partially in elevation taken substantially along the line 7—7 of FIGURE 1 as viewed in the direction indicated by the arrows; and FIGURE 8 is an enlarged sectional view taken substantially along the line 8—8 of FIGURE 7 as viewed in the direction indicated by the arrows.

Similar reference characters refer to similar parts throughout the several views of the drawing.

Having reference now to the drawings in detail, the device of the instant invention is generally indicated at 10, and is adapted to be attached to a conventional tractor, generally indicated at 11, which includes front wheels 12 mounted on an axle 12a, a frame 13, a motor 14, relatively large rear wheels 15, and an axle and housing 16. The tractor is provided with the conventional controls, including a steering wheel 17 as illustrated in FIGURE 1, and a driver's seat 18.

Hangers or supports 21 are adapted to be permanently affixed to the axle housing 16 on opposite sides thereof and are reinforced by diagonal brace members 22 which are secured as by means of bolts 23 to a channel iron member 24 secured to the underside of the tractor frame at an intermediate point. Brackets 21 include a pair of upright plates 25 which are adapted to be secured on opposite sides of axle housing 16 and retained permanently in association therewith, and depending plates 26, to the lower portions of which are attached as by means of pivot pins 27, blade support plates 28, which are secured at their rear ends to an angle iron 29, to which is secured an arcuate scraper blade 30, which is provided at its extremities with guide wings or plates 31 having angularly disposed reinforcing ribs 32 formed therein to assist in controlling the earth moved by blade 30.

Apertured lugs 33 extend rearwardly from angle iron support 29, and additional lugs 34 having double openings 35 therein are positioned on top of the angle iron support member 29. Lugs 33 have pivotally secured thereto as by means of pivots 36 parallel arms 37 which comprise portions of a feeler element including a transverse support 38 from which a beam 39 extends a substantial distance rearwardly, diagonally disposed reinforcing members 40 being positioned between the ends of member 38 and beam 39. At its outer extremity the beam 39, which may be in any desired length from 20 to 50 feet or more, there is positioned a bushing 41, which has a shaft 42 rotatably mounted therein, the lower end of the shaft carrying a yoke 43 which mounts a tracer wheel 44.

A control wire 45 is secured at one end to a lug 46 adjacent sleeve or bushing 41, and at its other end to a hook 47 mounted at the upper end of a valve control rod 48 which is pivoted at its lower end as at 49 in one of the openings 35 in lug 34.

A pair of valve control rods 50 and 51 connected by transverse members 52 to act in unison are pivotally mounted on a bar 53 which includes end portions 54 which are pivotally mounted on pivots 55, all as best shown in FIGURE 3, in the forward openings 35 of lugs 34.

A relatively heavy coil spring 60 extends between a hook 61 secured to the top of valve control rod 48 to a corresponding hook 62 carried by the upper extremity of rod 51. A beam or support 65 pivotally connected to the front of the tractor by a horizontal pivot 65', extends forwardly a desired distance from the front end of tractor frame 13 in line with valve control rod 50; and a cable 63 extends from a hook 64 carried by the upper end of control rod 50 to an apertured lug 64a carried by the top of the forward end of beam 65. A front tracer element or wheel 65a is carried by an offset yoke 65b which in turn is swivelly mounted on a shaft 65c carried by the extreme forward end of beam 65. Movement of front tracer wheel 65a thus, through cable 63, effects movement of control rod 50 in accordance with the contour of the ground ahead of the tractor; and in turn raises and lowers scraper blade 30, in a manner to be more fully described hereinafter.

The reason for the dual valve control rods 50 and 51 is to permit the cable 63 to extend in a straight line with the beam 65 and operate simultaneously control rod 51 which is synchronized and operates in unison with control 50, control rod 51 being centered and in alignment with control rod 48 to permit a straight line linkage of spring 60.

A hydraulic cylinder 70 is pivotally secured as by means of a pivot 71 to a lug 72 which is mounted between angularly upwardly inclined braces 73 which are secured to a lifting bar 74 which is in turn securely affixed to the members 28 for raising and lowering scraper blade 30. The rod 75 of a hydraulic piston contained within cylinder 70 is pivotally affixed as by means of a pivot 76 to a plate 77 which in turn is fixedly secured as by means of bolts 78 to the tractor draw bar 79.

Obviously, movement of the piston within cylinder 70 will through members 73 and 74 and members 28 raise and lower scraper blade 30 as required.

Fluid is supplied to cylinder 70 through fluid lines 80 and 81, which are in turn connected to a hydraulic control valve 82, the latter being supplied with fluid from a line 83, which extends to any suitable source of fluid supply carried by the tractor or the like. Valve 82 contains a spool 86, movement of which vertically selectively controls the admission of fluid to lines 81 and 80, and consequently the relative position of the piston in cylinder 70 and, therefore, the height of scraper blade 30.

Control of the spool 86 is effected through a cam follower wheel 85 which is mounted in a yoke 86 at the lower extremity of the spool, and which engages a cam surface 87 on a bar 88 which extends telescopically within a cylinder or sleeve 89 which is secured to a sleeve 90 pivotally mounted on a pin 91 fixedly secured to valve control arm 48. The outer end of rod 88 is pivotally connected as by means of a pivot 92 to an elbow 93 which comprises a component of a manual control lever 94 having an operating lever 95 which extends closely adjacent driver seat 18 for manual control by the driver.

The other end of elbow 93 is pivotally mounted on a pivot 96 which extends through a sleeve 97 which is welded to a friction plate 99. Friction plate 99 engages a friction plate 98 which is fixedly secured as by welding to control member 51, a rubber washer 99a and a hard steel plate 100 serving to hold the friction plates in juxtaposition, there being a self locking nut 101 positioned on the end of bolt or pivot 96. A stop pin 102 engaging in an arcuate slot 103 carried by a flange 104 secured to friction plate 98 limits the relative movement of elbow 93 relative to its associated control rod 51.

In the use and operation of the device as the wheel 65a drops below level, cable 63 moves control arms 50 and 51 against the bias of spring 60 which in turn moves the relatively low dwell of rod 88 into position to permit the valve member 86 to move to a position to admit fluid to that side of hydraulic cylinder 70 which will lower the scraper blade. Similarly, when the wheel 65a is raised by an unevenness in the ground, the opposite action will occur, it being noted that the follower wheel 85 normally rests when the hydraulic pressure is on intermediately of the cam surface 87.

Similarly, as the rear tracer wheel 44 is raised or lowered, control rod 48 is permitted to move in a similar manner to move sleeve 89 while rod 88 remains stationary and effect a corresponding result.

From the foregoing it will now be seen that there is herein provided an improved land leveler, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A land leveler comprising, in combination with a tractor, a scraper blade, means for pivotally securing said blade to the rear of said tractor, hydraulic means for raising and lowering said blade, a frame member secured to said blade, a rear feeler element including a tracer wheel pivotally secured to said frame, a first control arm pivoted to said frame member and extending upwardly and rearwardly therefrom, flexible means securing the top of said first control arm to the rear of said feeler element, a second control arm pivoted to said frame member independently of said first control arm and extending upwardly and forwardly therefrom, a front feeler element, a flexible connection between said second control arm and the front feeler element, a spring connecting the top of said first and second control arms, valve control means extending between said first and second control arms and actuated by the relative position of said arms to each other to control said hydraulic means to raise and lower said scraper blade in accordance with the raising and lowering of said front and rear tracer wheels, said valve control means including a sleeve pivotally secured to one of said control arms, a rod telescoping into said sleeve pivotally secured to the other of said control arms, a hydraulic control valve mounted on said sleeve, a piston in said valve, a cam follower on said piston, and a cam surface on said rod engaged by said cam follower.

2. A land leveler comprising, in combination with a tractor, a scraper blade, means for pivotally securing said blade to the rear of said tractor, hydraulic means for raising and lowering said blade, a frame member secured to said blade, a rear feeler element including a tracer wheel pivotally secured to said frame, a first control arm pivoted to said frame member and extending upwardly and rearwardly therefrom, flexible means securing the top of said first control arm to the rear of said feeler element, a second control arm pivoted to said frame member independently of said first control arm and extending upwardly and forwardly therefrom, a front feeler element, a flexible connection between said second control arm and the front feeler element, a spring connecting the top of said first and second control arms, valve control means extending between said first and second control arms and actuated by the relative position of said arms to each other to control said hydraulic means to raise and lower said scraper blade in accordance with the raising and lowering of said front and rear tracer wheels, said valve control means including a sleeve pivotally secured to one of said control arms, a rod telescoping into said sleeve pivotally secured to the other of said control arms, a hydraulic control valve mounted on said sleeve, a piston in said valve, a cam follower on said piston, a cam surface on said rod engaged by said cam follower, and a manual control handle pivoted to said rod for manual movement thereof.

3. A land leveler comprising, in combination with a tractor, a scraper blade, means for pivotally securing said blade to the rear of said tractor, hydraulic means for raising and lowering said blade, a frame member secured to said blade, a rear feeler element including a tracer wheel pivotally secured to said frame, a first control arm pivoted to said frame member and extending upwardly and rearwardly therefrom, flexible means securing the top of said first control arm to the rear of said feeler element, a second control arm pivoted to said frame member independently of said first control arm and extending upwardly and forwardly therefrom, a front feeler element, a flexible connection between said second control arm and the front feeler element, a spring connecting the top of said first and second control arms, valve control means extending between said first and second control arms and actuated by the relative position of said arms to each other to control said hydraulic means to raise and lower said scraper blade in accordance with the raising and lowering of said front and rear tracer wheels, said valve control means including a sleeve pivotally secured to one of said control arms, a rod telescoping into said sleeve pivotally secured to the other of said control arms, a hydraulic control valve mounted on said sleeve, a piston in said valve, a cam follower on said piston, a cam surface on said rod engaged by said cam follower, a manual control handle pivoted to said rod for manual movement thereof, and locking means retaining said manual control handle against accidental movement.

References Cited in the file of this patent

UNITED STATES PATENTS

| | | |
|---|---|---|
| 2,732,640 | Kirchner | Jan. 31, 1956 |
| 3,034,239 | Waterson | May 15, 1962 |